(12) United States Patent
Alumbaugh (10) Patent No.: US 6,278,938 B1
(45) Date of Patent: Aug. 21, 2001

(54) METHOD OF PROCESSING WAYPOINT DATA FOR TRAVEL GUIDE DEVICE

(76) Inventor: Wendell Alumbaugh, 1301 Meadow Ridge Ct., Southlake, TX (US) 76092-8441

( * ) Notice: Subject to any disclaimer, the term of this patent is extended or adjusted under 35 U.S.C. 154(b) by 0 days.

(21) Appl. No.: 09/572,824

(22) Filed: May 17, 2000

Related U.S. Application Data

(62) Division of application No. 09/063,099, filed on Apr. 20, 1998.
(60) Provisional application No. 60/068,775, filed on Dec. 24, 1997.

(51) Int. Cl.[7] .................................................. G01C 21/32
(52) U.S. Cl. ........................... 701/208; 701/211; 701/213
(58) Field of Search ......................... 342/357.13, 357.09; 701/213, 208, 211

(56) References Cited

U.S. PATENT DOCUMENTS 5,517,419 * 5/1996 Lanckton et al. ..................... 701/216
5,543,802 * 8/1996 Villevielle et al. ................... 701/213
5,751,245 * 5/1998 Janky et al. ..................... 342/357.07
6,084,542 * 7/2000 Wright et al. ..................... 342/357.13

* cited by examiner

Primary Examiner—Gregory C. Issing
(74) Attorney, Agent, or Firm—John D. Pemberton (57) ABSTRACT

A travel guide device includes a GPS receiver for determining a present location. Access to a database of points-of-interest, indexed by GPS location, is provided to permit timely presentation of audio narration or visual display of information relevant to the point-of-interest. A running, general area narrative and/or display may alternatively be provided. The travel guide device may provide educational and entertaining games, including interactive competitive games, relating to the points-of-interest and general area narratives. A navigation function includes automatic, intelligent collection of waypoints and general directions without stored, detailed maps of an area for which directions are being provided. Waypoint collections may be employed to document a route travel, to retrace the route, or for other purposes. A directory of locations such as restaurants, filling stations, and the like may be accessed by the travel guide device to determine GPS coordinates for a desired destination for general directions navigation. Communication facilities integrated into the travel guide device provide optional communications services, such as downloading a local directory for an area being entered.

16 Claims, 12 Drawing Sheets

METHOD OF PROCESSING WAYPOINT DATA FOR TRAVEL GUIDE DEVICE

This is a Division of application Ser. No. 09/063,099, filed Apr. 20, 1998, currently pending, which claim benefit of provisional application No. 60/068,775 filed Dec. 24, 1997.

BACKGROUND OF THE INVENTION

1. Technical Field

The present invention relates generally to global positioning systems (GPS) in automotive vehicles and in particular to global positioning systems which are utilized to identify a vehicle's location with respect to surrounding features. Still more particularly, the present invention relates to a travel guide for an automotive vehicle system which employs global positioning system data to provide information regarding points of interest as well as directional information.

2. Description of the Related Art

Global positioning systems (GPS) are being utilized in a number of broad-based consumer environments, including within automotive vehicles. Several automobile manufacturers provide accessories allowing the driver to identify their location with respect to surrounding features (streets, buildings, etc.), and may provide a display assisting the driver in reaching their destination. Such capabilities have typically been limited, however, to providing information such as street names to the driver.

Entertainment devices for use in automobiles are becoming increasingly widespread. For example, in addition to conventional entertainment devices such as AM/FM radio receivers, cassette players, and compact disc (CD) players, it is now possible to purchase or lease integrated video cassette recorders (VCRs)/televisions, allowing videos to be displayed during the trip. Such features are especially beneficial to drivers travelling with young children, providing a distraction for such children.

It would be desirable to provide a system which utilizes the GPS coordinates of a present location to coordinate the provision of entertainment information to a vehicle driver and/or passenger(s). It would also be desirable for the entertainment information to be automatically and spontaneously provided to the travelers, interrupting or superseding any programs in progress to provide entertainment information keyed on location to avoid timing difficulties. It would further be advantageous to provide a system which also supports interactive applications with such entertainment information.

SUMMARY OF THE INVENTION

A travel guide device includes a GPS receiver for determining a present location. Access to a database of points-of-interest, indexed by GPS location, is provided to permit timely presentation of audio narration or visual display of information relevant to the point-of-interest. A running, general area narrative and/or display may alternatively be provided. The travel guide device may provide educational and entertaining games, including interactive competitive games, relating to the points-of-interest and general area narratives. A navigation function includes automatic, intelligent collection of waypoints and general directions without stored, detailed maps of an area for which directions are being provided. Waypoint collections may be employed to document a route travel, to retrace the route, or for other purposes. A directory of locations such as restaurants, filling stations, and the like may be accessed by the travel guide device to determine GPS coordinates for a desired destination for general directions navigation. Communication facilities integrated into the travel guide device provide optional communications services, such as downloading a local directory for an area being entered.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A–3K depict high level flowcharts for the major functional features contemplated for operation of a travel guide device in accordance with a preferred embodiment of the present invention.

DETAILED DESCRIPTION

Figure 1:
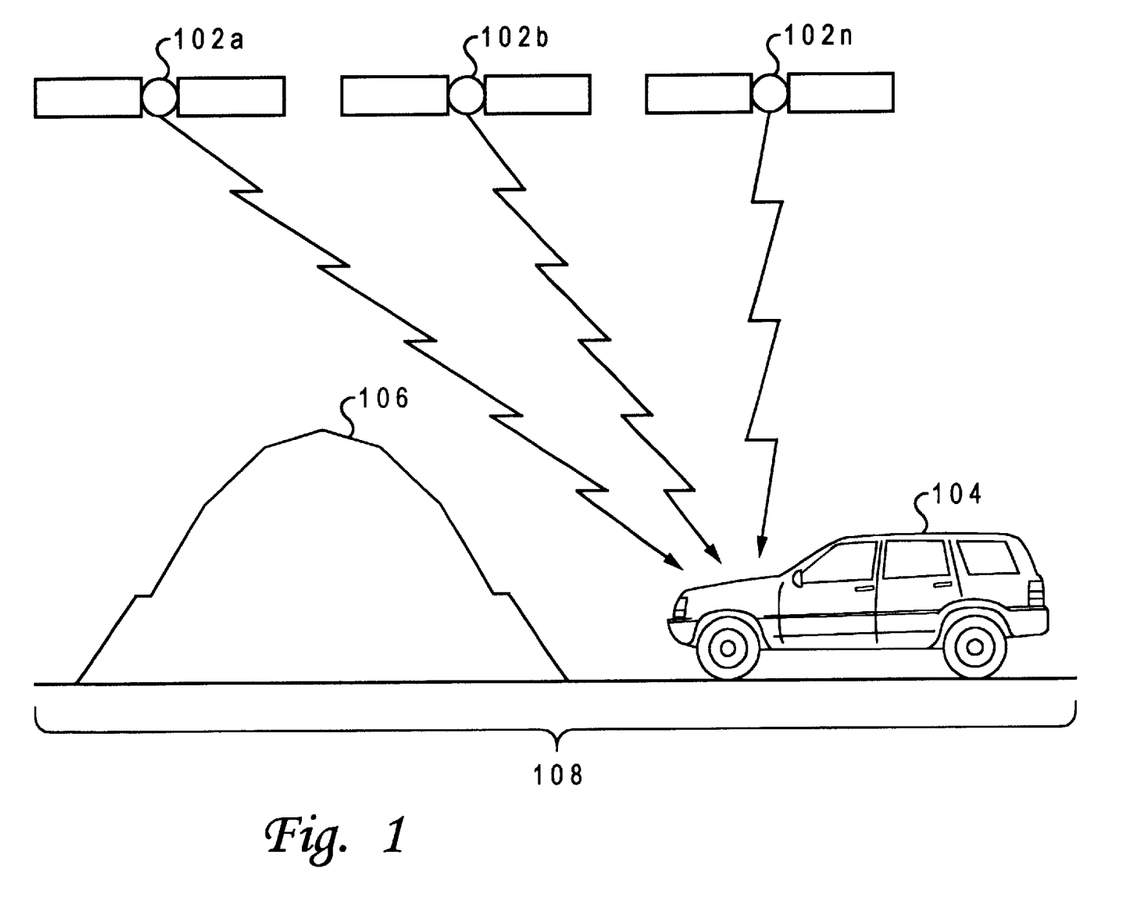
FIG. 1 depicts an environment in which a preferred embodiment of the present invention may be implemented.

With reference now to the figures, and in particular with reference to FIG. 1, an environment in which a preferred embodiment of the present invention may be implemented is depicted. The present invention utilizes one or more global positioning system (GPS) satellites 102a–102n orbiting the earth and providing signals from which GPS coordinates of a surface location may be ascertained in accordance with the known art. The present invention may be implemented within a vehicle 104 containing a travel guide device (not shown) moving through a region containing at least one location 106 having a known set of GPS coordinates, or within a predefined region 108 including a known set or ranges of GPS coordinates. The construction and operation of the travel guide device is described in further detail below. Although depicted as being utilized in conjunction with a vehicle, the travel guide device has application in a variety of modes of travel, including land-based vehicles (passenger vehicles, off-road vehicles, etc.), aircraft, boats, transportation by animal and walking. Not all of the functionality described below need be implemented for every mode of travel, and the implementation of different features may vary according to mode of travel.

Figure 2:
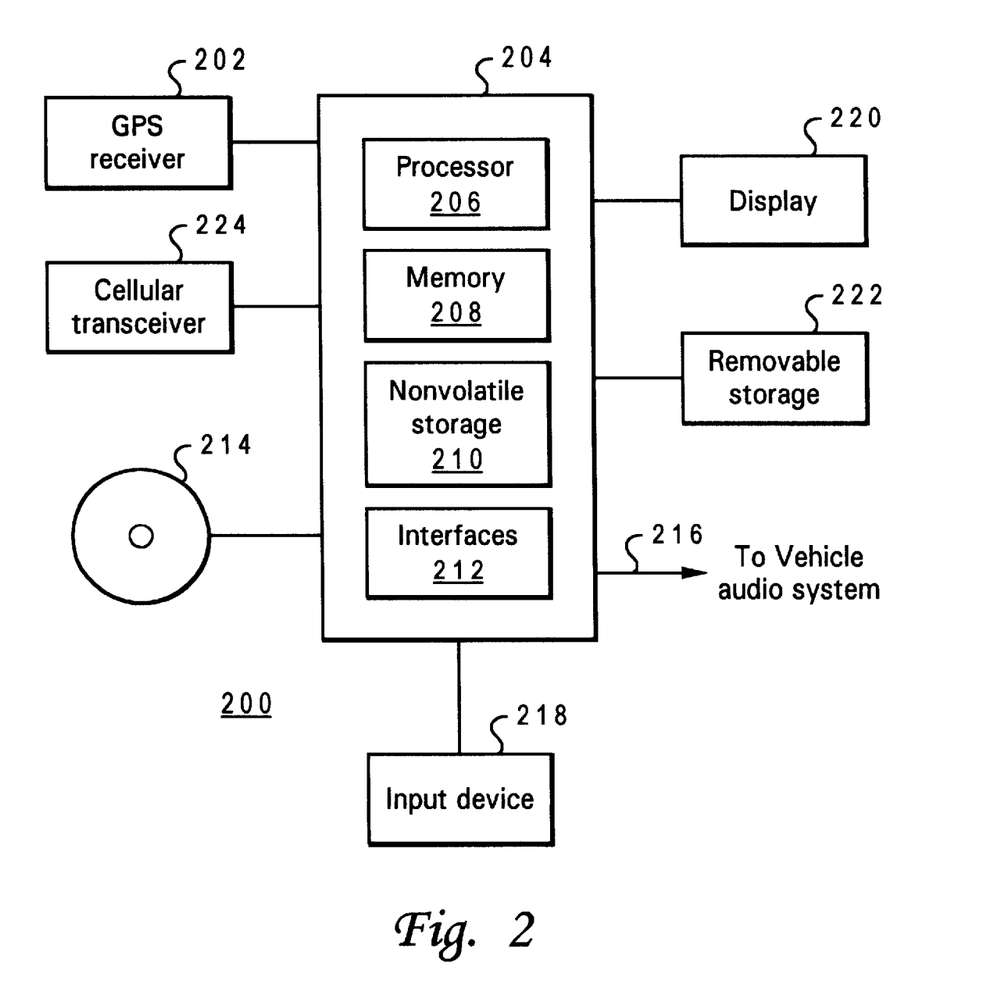
FIG. 2 is a block diagram of a travel guide device in accordance with a preferred embodiment of the present invention.

Referring to FIG. 2, a block diagram of a travel guide device in accordance with a preferred embodiment of the present invention is illustrated. Travel guide device 200 includes a GPS receiver 202, which may be a commercially available GPS receiver providing GPS coordinates for a current location over a standardized interface. GPS receiver provides GPS coordinates on a periodic basis to data processing system 204. Data processing system 204 may be a conventional portable data processing system such as a laptop or notebook computer, or may be a dedicated data processing system. Data processing system 204 should include a processor 208 for executing instructions necessary to implement the required functionality, a memory 208 in which such instructions and relevant data may be stored, a nonvolatile memory 210 containing additional necessary functionality such as, for instance, an operating system and/or a basic input/output system (BIOS), and interfaces 212 to various peripheral devices, including GPS receiver 202. The construction and operation of a suitable data processing system 204 is well known in the art and need not be further described.

Travel guide device 200 also includes a database 214 accessible to data processing system 204 which may be contained on a compact disc (CD), a compact disc read-only memory (CD ROM), or a digital video disc (DVD) accessed through an appropriate peripheral device. Database 214 contains a plurality of information blocks or references for locations within a predefined geographic region, indexed by the GPS coordinates for the respective location. The references (not shown) may be indexed to a specific GPS coordinate (latitude and longitude), or to a range of GPS coordinates. Database 214 also includes any offsets, etc., necessary for operation of the travel guide device in one or more of the manners described below.

Travel guide device 200 includes a connection 216 to a vehicle audio system or other appropriate presentation or playback device, which may include a display device 220 such as a television and/or VCR within the vehicle. When connected to the vehicle audio system or other presentation device, travel guide device 200 should be capable of interrupting or superseding any programs currently in progress within such presentation devices, such as music or recorded movies. This may be accomplished by simply providing alternative feed sources to such presentation devices with a feed selection mechanism, such as a multiplexer or switch, controlled by travel guide device 200. In addition to a connection to the vehicle audio system, travel guide device 200 may include an audio and/or video output device. Furthermore, display device 220 may actually comprise a plurality of display devices, each displaying the same view, and may include a "heads-up" display device.

Travel guide device 200 also includes an input device 218 permitting a user to selectively activate travel guide device or actuate selected features of operation. Input device 218 may be a keyboard, mouse, or other standard input device for a conventional data processing system, or may be dedicated switches or control buttons. As noted earlier, travel guide device 200 may optionally include at least one display 220, which may be integrated with input device 218 in the form of a touch-screen input/display device. Travel guide device 200 may also optionally include storage 222 for storing recorded information regarding a trip taken with travel guide device 200, all or part of which may be either removable and/or rewritable. Travel guide device may further include cellular transceiver 224 for contacting emergency services or receiving updates to database 214, or performing other functions as described below.

The components illustrated in FIG. 2 are provided solely for the purposes of explaining and describing the present invention and are not intended to imply any architectural limitations. Those skilled in the art will recognize that a variety of alternative implementations for a travel guide device are possible, all within the spirit and scope of the present invention.

Referring to FIGS. 3A through 3K, a travel guide device in accordance with a preferred embodiment of the present invention includes a plurality of user selectable operating modes, each providing a different functionality. High level flowcharts are depicted in FIGS. 3A–3K for the major functional features contemplated for a travel guide device in accordance with the present invention.

Figure 3A:
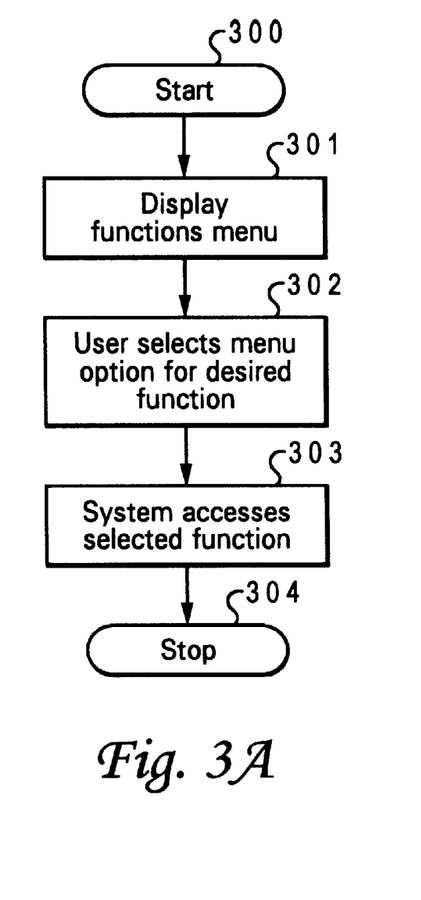

FIG. 3A depicts a high level flowchart for user selection of a functional feature of the travel guide device. The process begins at step 300, which illustrates starting the user selection function, and then passes to step 301, which depicts displaying a functions menu to the user. The process next passes to step 302, which depicts a user selecting a menu option for a desired function, and then to step 303, which illustrates the travel guide device system accessing the selected function. The process passes next to step 304, which illustrates the user selection function becoming idle until again invoked by a user.

One functional feature of a travel guide device of the present invention which may be selected by the user in the process described above is a narration function, in which the vehicle location, direction of travel, speed, and/or altitude, is ascertained to an acceptable accuracy from data received by the GPS receiver, or from information derived from that data. Matching this vehicle location information to indexed references stored within the database, the travel guide device provides a timely narration regarding a passing point of interest or a general area through which the vehicle is travelling.

Figure 3B:
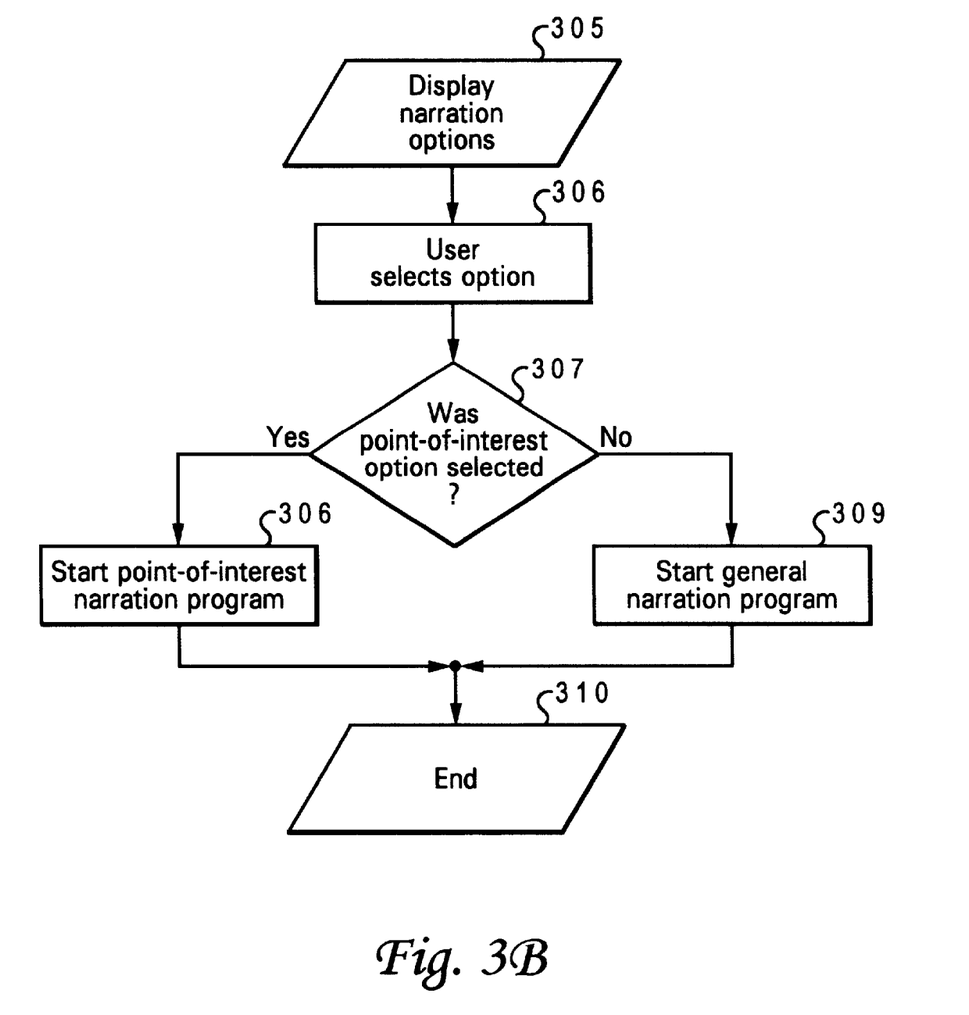

FIG. 3B depicts a process for user selection of a narration option. The process begins at step 305, which illustrates displaying the narration options to the user, which includes point-of-interest narration and general area narration. The process then passes step 306, which depicts user selection of an option, and next to step 307, which illustrates a determination of whether the point-of-interest narration option was selected. If so, the process proceeds to step 308, which depicts starting the point-of-interest narration program. Otherwise, the process proceeds instead to step 309, which illustrates starting the general area narration program. From either of steps 308 or 309, the process passes to step 310, which depicts ending the process for user selection of a narration option.

Figure 3C:
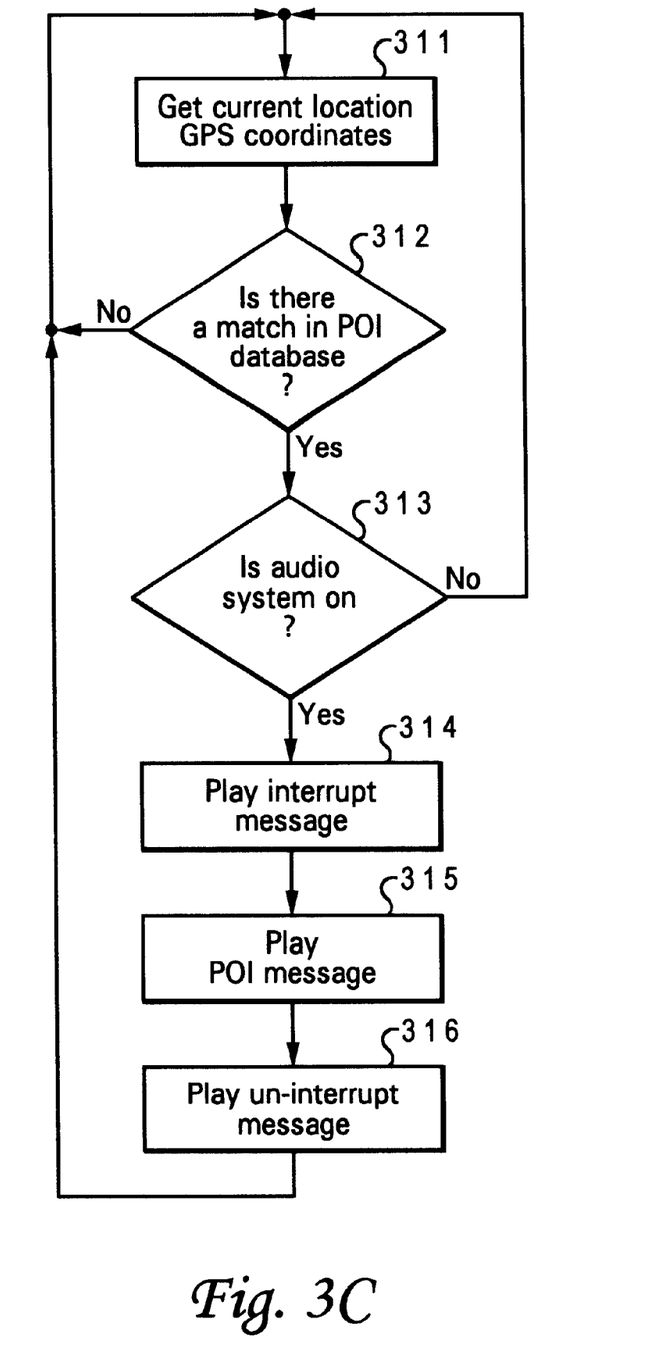

FIG. 3C depicts the process of point-of-interest narration within the travel guide device of the present invention. The GPS coordinates of a number of points-of-interest for a defined geographic region are contained within the database, together with associated narration information. The associated narration information may be, for example, digital audio and/or video information containing a narration or depiction of one or more facts regarding each point-of-interest location within the database, which may include unusual attributes of a point-of-interest location or interesting historical events which occurred proximate to the point-of-interest location.

In accordance with the present invention, the travel guide device determines when the vehicle is approaching a point-of-interest location and, at an appropriate time, automatically begins transmitting the narration information associated within the database with the GPS coordinates of the point-of-interest location being approached. The timing of the transmission of the narration information may be correlated to the location and speed of the vehicle, ascertained from the GPS coordinates provided by the GPS receiver. The narration information is transmitted to a playback device such as an audio or video system within the vehicle. Thus, for example, when the vehicle is moving through northern New Mexico towards Raton with music playing on the audio system within vehicle, the travel guide device may retrieve from a reference entry associated with a point-of-interest location from a database for the southwest United States, automatically interrupt the music, and transmit a digitally encoded narration to the audio system such as:

"Travel Guide interrupts your current program to bring you a Point of Interest.

On your right is Capulin Mountain, the highest volcano east of the Continental Divide in the United States. Capulin was formed during the volcanic period over 150,000 years ago. The area through which you are passing includes several volcanoes which were active during that time. The smaller hills approaching on your left are also volcanoes from the same period.

Capulin Mountain is a national monument and may be visited seven days each week between 7:00 am and 6:00 pm. The fee is $3.00 per adult and $1.00 for children under 12.

Travel Guide now returns to the interrupted program".

The travel guide device thus automatically provides entertainment information relating to a point-of-interest location to a playback device within the vehicle as the vehicle nears the point-of-interest location, interrupting any current entertainment program which may be in progress. The entertainment information may include narrations describing interesting attributes or historical events associated with a point-of-interest location as described above, or may also include video depictions of such attributes or historical events for display on a video system (not shown) within the vehicle.

The travel guide device automatically and spontaneously informs and entertains travelers within the vehicle, which may, for instance, include vacationing tourists, about passing points of interest as they travel. The travel guide device may, for instance, be leased to the tourists by a travel or tour service, together with one or more databases for a geographic region through which the tourists plan to travel. Alternatively, the travel guide device may be employed by a park, such as a national park or a wildlife park, to provide self-guided, self-paced tours. The accuracy of most commercial GPS systems is generally about 100 feet, making the travel guide device suitable for self-guided tours in large parks or entertainment complexes. Because the entertainment information is keyed to location, timing difficulties associated with a continuous-play embodiment are avoided.

After the point-of-interest narration program is started (see step 308 in FIG. 3B), the process proceeds to step 311, which depicts getting the current location GPS coordinates from the GPS receiver. The process then passes to step 312, which illustrates a determination of whether a match may be determined for the point-of-interest entries within the database. This determination may involve ascertaining whether the vehicle is within a range of distances from the GPS coordinates of the point-of-interest location, and may require computations relating to the vehicle speed and an offset associated with the narrations information (based on a length of the narration information) used to determine when the narration should be started for timely presentation.

If no match is identified within the point-of-interest entries for the database, the process returns to step 311 to obtain updated GPS coordinates from the GPS receiver. If a matching point-of-interest entry is identified, however, the process proceeds instead to step 313, which depicts a determination of whether the playback device, the vehicle audio system in the exemplary embodiment, is on. If not, the process simply returns to step 311 for updated GPS coordinates and continues making the point-of-interest determinations until a suitable playback device is turned on within the vehicle.

If the vehicle audio system is on, the process proceeds instead to step 314, which illustrates playing an interrupt message, then next to step 315, which depicts playing the point-of-interest narration message, and then to step 316, which illustrates playing the un-interrupt message. An example of these messages was described earlier. The process then returns to step 311 to retrieve updated GPS coordinates from the GPS receiver, seeking to ascertain another matching point-of-interest location within the database.

Figure 3D:
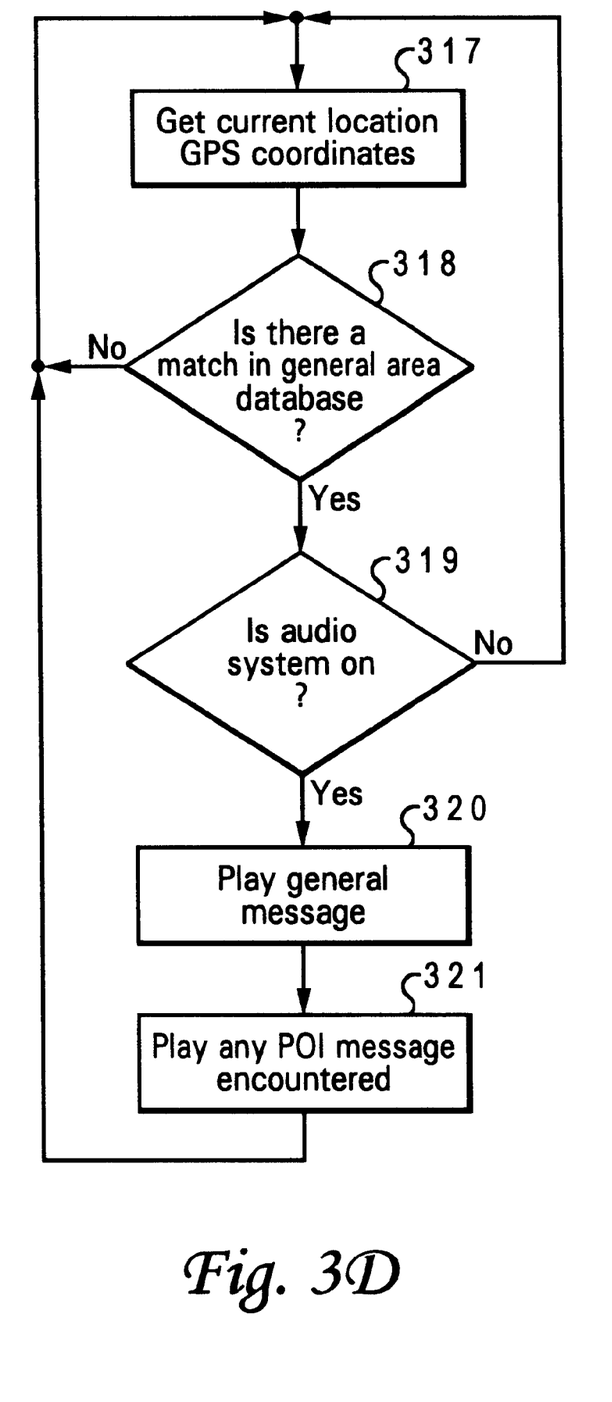

FIG. 3D depicts a general area narrative process. In addition to interrupting currently playing entertainment to provide point-of-interest narrations, the travel guide device may provide a running narrative regarding the general area through which the vehicle is travelling. For instance, assuming the same location and database described above, the travel guide device might provide a narration including, in part:

"In the early 1800's, this area of northern New Mexico was one of the main homelands of the Apache Indians.

The Cimmaron Trail, which passes about 10 miles south of your current location, was used by wagon trains traveling west. The trail was also used to move herds of cattle . . . "

The narration might continue for several minutes, and may be segmented to allow pauses or point-of-interest narrations to be inserted or to skip portions, depending on the vehicle's speed. Thus, entertaining and/or educational information regarding a general area through which the vehicle is passing may be provided in a timely fashion to the travellers.

After the general area narration program is started (see step 309 in FIG. 3B), the process proceeds to step 317, which depicts getting the current location GPS coordinates from the GPS receiver. The process then passes to step 318, which illustrates a determination of whether a match may be determined for the general area entries within the database. This determination may involve ascertaining whether the GPS coordinates for the vehicle's present location fall within a predefined range of GPS coordinates for a general area entry.

If no match is identified within the general area entries within the database, the process returns to step 317 to retrieve updated GPS coordinates from the GPS receiver. If a matching general area entry is identified, the process proceeds instead to step 319, which depicts a determination of whether a suitable playback device such as the vehicle audio system is on. If not, the process simply returns to step 317. If a suitable playback device is on, however, the process proceeds instead to step 320, which illustrates playing the general area narration message associated with the matching general area entry, then next to optional step 321, which depicts playing any point-of-interest narration messages which may fall within the range of GPS coordinates defining the region for a matching general area entry. The process then returns to step 317 to retrieve updated GPS coordinates from the GPS receiver, seeking to identify a subsequent general area entry matching the vehicle's location.

Figure 3E:
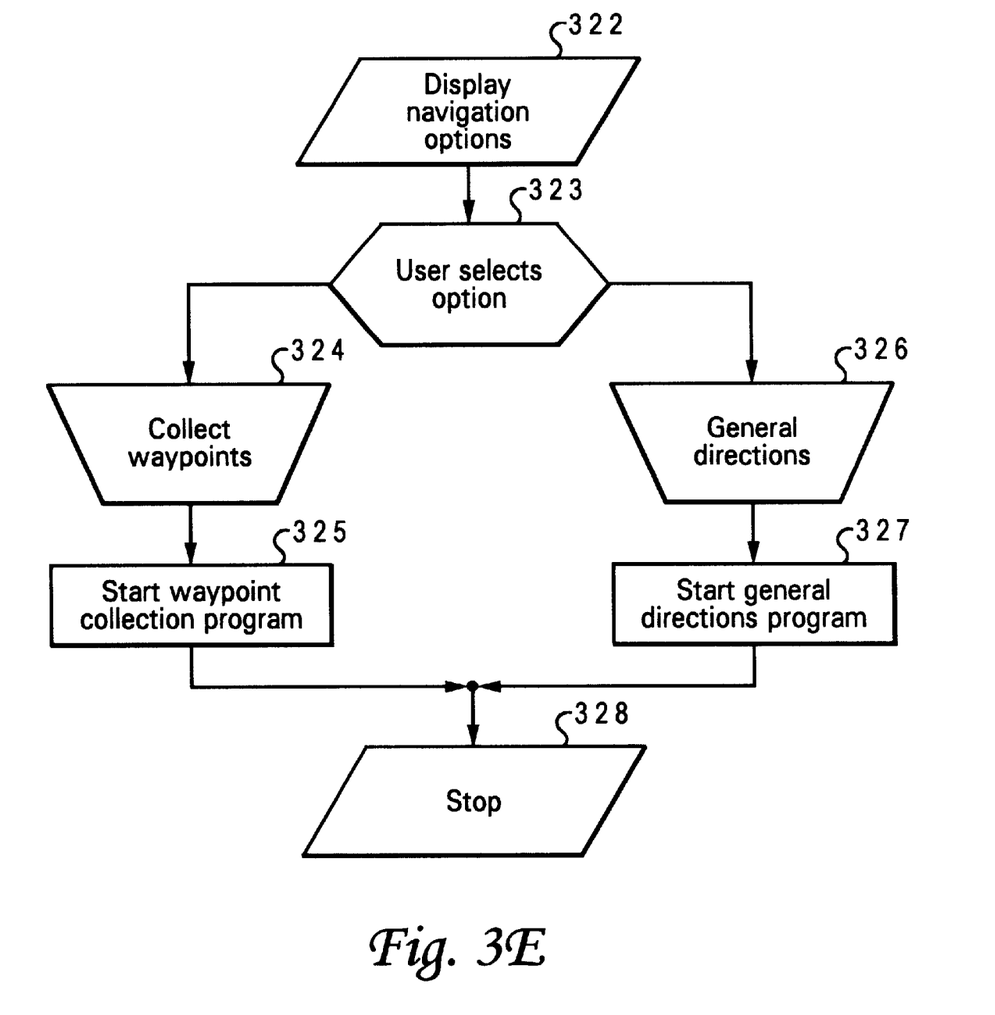

FIG. 3E depicts user selection of a navigation function option within the travel guide device of the present invention. Knowing the location of a vehicle, determined within an acceptable accuracy from the GPS coordinates retrieved from the GPS receiver, the travel guide device may identify the latitude and longitude, altitude, direction of travel and speed of travel at any given instant. As used herein, the term "waypoint" refers to a datapoint including at least the latitude and longitude of a location during travel, and optionally the altitude, direction and speed, and other attributes.

The travel guide device of the present invention utilizes data received from the GPS receiver and information derived from that data to implement at least two navigation options: an advanced method for automatically collecting and storing waypoints representing a route traveled, and the provision of general direction to a destination. Although described as separate options, the two are complementary and may be implementing in an interlocking fashion.

The process for user selection of a navigation option begins at step 322, which illustrates displaying the navigation options. The process then passes to step 323, which depicts user selection of a navigation option. The process may then pass to step 324, which illustrates user selection of the waypoint collection option, and then to step 325, which depicts starting the waypoint collection program of the present invention. Alternatively, the process may instead pass to step 326, which illustrates user selection of the general directions option, and then to step 327, which depicts starting the general directions program of the present invention. From either of steps 325 or 327, the process passes to step 328, which illustrates stopping the process for user selection of a navigation option.

Figure 3F:
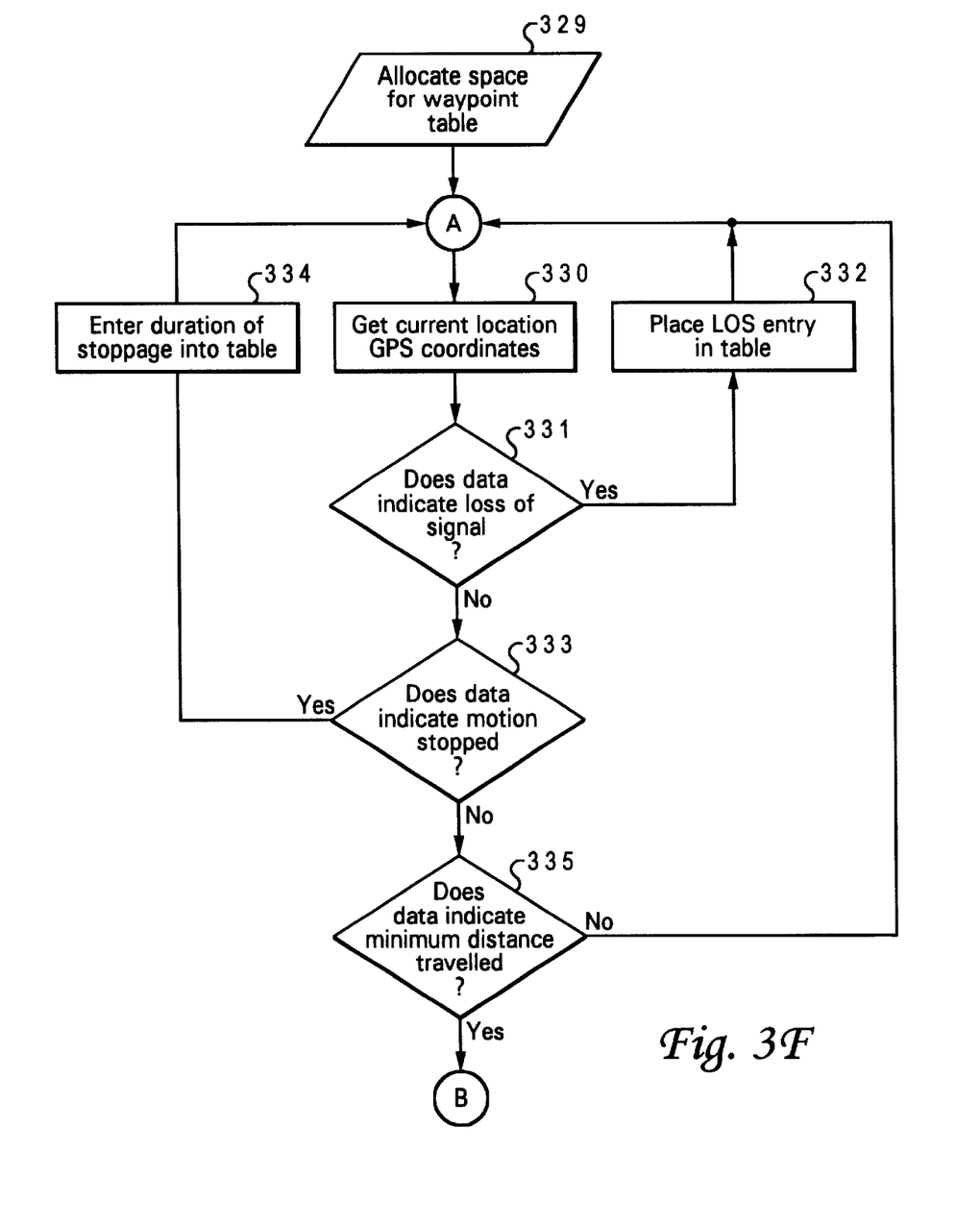
Figure 3G:
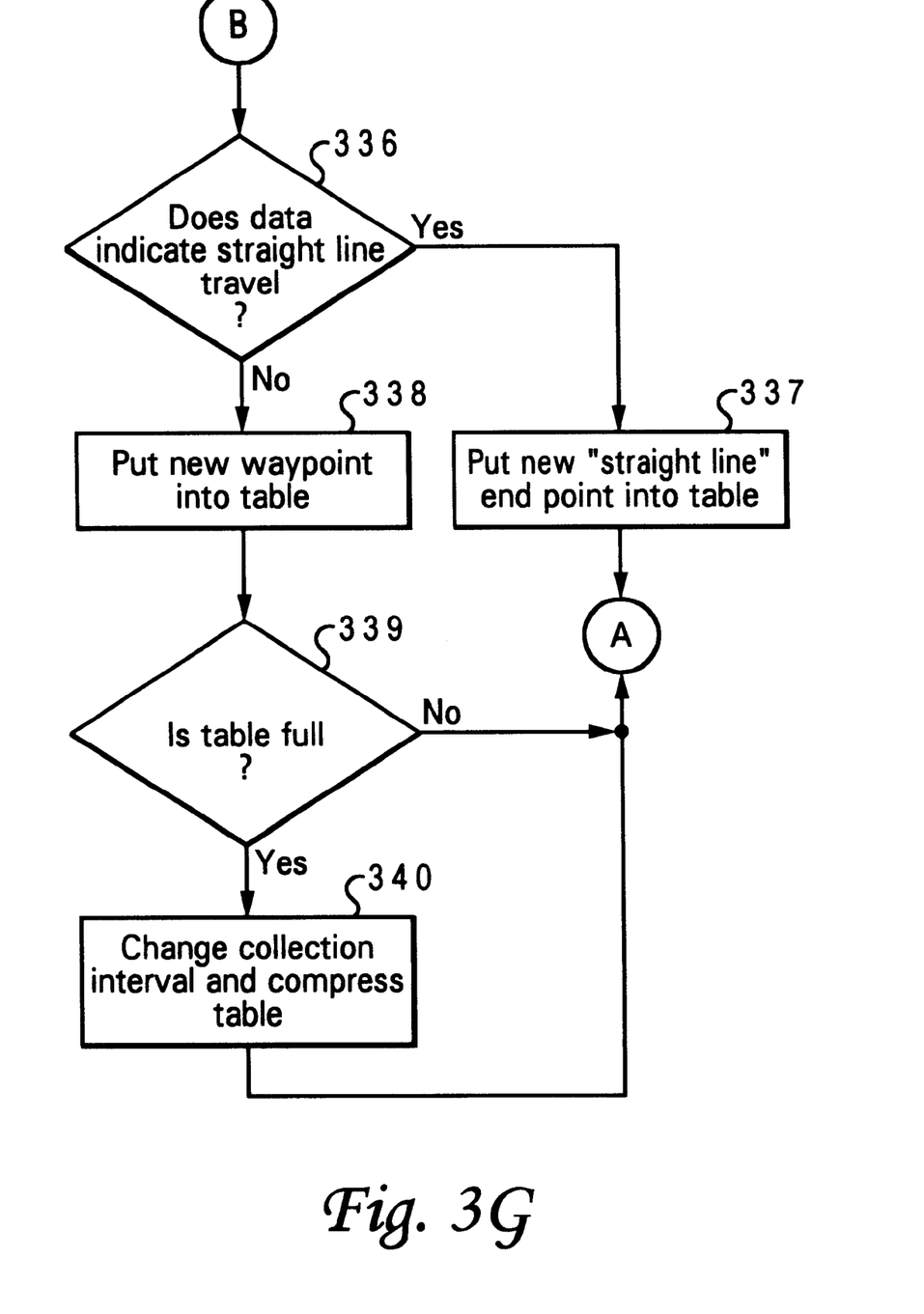

FIGS. 3F and 3G depict a process for automatic waypoint collection within the travel guide device of the present invention. Simple manual and automatic storing of waypoints derived from a GPS receiver during travel are known in the art. In the travel guide device of the present invention, however, waypoints are automatically collected, analyzed, and refined for their intended purpose. The enhanced waypoint collection is stored as a table of information, within a memory or an storage device. The resulting table of waypoints is a representation of a travelled path with an accuracy appropriate for the intended use.

The process begins at step 329, which depicts allocating space for the waypoint table within the desired storage media. The process next passes to step 330, which illustrates retrieving the current location GPS coordinates from the GPS receiver, and then to step 331, which depicts a determination of whether the data retrieved from the GPS receiver indicates a loss of signal (LOS). If so, the process proceeds to step 332, which illustrates placing an LOS entry within the table, and then returns to step 330. The next retrieval of GPS coordinates will then be initiated after the elapse of a defined period, which may be adjusted by the user to define the granularity of the waypoint table or automatically adjusted by the system based on available space in the storage device holding the waypoint table and/or a frequency with which the travel path changes directions.

If no loss of signal has occurred, and GPS coordinates for a current location are available, the process proceeds instead to step 333, which depicts a determination of whether the retrieved GPS coordinates indicate that motion of the travel guide device, and the vehicle in which the travel guide device is being employed, has stopped. This determination may be made by comparing the GPS coordinates for the current location with the last waypoint in the table, and may include some tolerance of slight movement. If motion has stopped, the process proceeds to step 334, which illustrates entering a duration of the stoppage into the table, and then returns to step 330.

If motion has not stopped, the process instead proceeds to step 335, which depicts a determination of whether the retrieved GPS coordinates indicate that a minimum distance required for storing a new waypoint has been travelled. The minimum distance may be selected by a user to achieve a desired granularity of waypoints, or automatically adjusted by the system based on space available within storage device holding the table and/or the frequency of changes in direction of travel. If a minimum distance has not been travelled, the process returns to step 330 for retrieving new GPS coordinates on a timed basis.

If a minimum distance has been traveled since the last waypoint was collected, the process proceeds instead to step 336 depicted in FIG. 3G, which illustrates a determination of whether the collected waypoint lies on a straight line with two previous waypoints. This may be determined by computing the azimuth between the newly collected waypoint and the last previous waypoint, computing the azimuth between the last two previous waypoints, and comparing the two azimuths. A small range of variation, such as 1° C. or less, may be tolerated in determining that the newly collected waypoint lies in a "straight" line with immediately preceding waypoints. This range of variation may be defined by a user to adjust the density of waypoints collected, or may be automatically adjusted by the system.

If the data derived from the newly collected waypoint indicates "straight" line travel, the process proceeds to step 337, which indicates placing a new straight line end point into the table, replacing the last previous waypoint. The process then returns to step 330 for retrieval of a new GPS coordinates reading. If the data does not indicate straight line travel within the defined acceptable variation, the process proceeds instead to step 338, which depicts adding a new waypoint to the table. The process then passes to step 339, which depicts a determination of whether the waypoint table is full.

If the space allocated for the waypoint table is not yet full, the process returns to step 330 depicted in FIG. 3F. If the allocated space has been filled, however, the process proceeds instead to step 340, which illustrates change the collection interval and compressing the waypoint table. A number of factors may be adjusted to compress the waypoint table, including the minimum distance between waypoints retained in the table and the tolerance between azimuths considered to form a "straight" line between waypoints. As the trip progresses, the granularity or density of waypoints automatically stored to record the trip is adjusted appropriately. The process then returns to step 330 depicted in FIG. 3F. The waypoint collection process thus continues until interrupted or killed. Waypoints automatically collected as described may be employed to generate a printout of the route taken, to refollow the route using the general directions navigation option described below, or utilized as reference information in publications, including digitally encoded maps.

Enhanced waypoint collection in the travel guide device of the present invention is derived from automatic sampling of GPS coordinates and analysis of the sample GPS coordinate data. GPS coordinate readings are not stored as waypoints unless a minimum distance travelled is detected, a parameter which may have a user selectable value. The GPS reading is also not stored if motion is essentially stopped, although a notation may be included within the table indicating the length of time motion was stopped. Changes in altitude may also be noted for periods when no significant latitude or longitude changes are detected. The parameters for deciding that no motion has occurred or for detecting altitude changes may have user selected values.

Waypoints reflecting an essentially straight line of travel are compressed into end points defining the straight line. The tolerance parameters for determining what comprises a "straight" line are also user selectable values. Whenever the GPS signal is lost for a significant number of collection intervals, a LOS notation is made in the waypoint table. Subsequent display of the route taken from the waypoint table may include a straight, dotted line connecting the last waypoint stored before loss of signal and the first waypoint stored after recovery of the signal, optionally with an appropriate notation indicating loss of signal.

If the waypoint table becomes full during collection, a number of alternatives may be implemented. A longer collection interval may be specified, with waypoints already stored being compressed as though collected based on the longer interval (waypoints may include a time stamp utilized for this purpose). Stored information may be off loaded into a different storage device, such as writing the table to a floppy disk or writing the collected waypoints from system memory to a hard disk drive or other nonvolatile memory. Selected portions of the stored waypoint information may be deleted, such as portions of the travel path which begin and end at the same GPS coordinates. The allocated space for the waypoint table may be dynamically altered if additional storage is available. Finally, storing of waypoints may be discontinued altogether once the allocated space is filled.

In addition to manually selected parameters for waypoint storage, the user may allow the travel guide device to automatically and continuously adjust the collection interval and compress already stored waypoints. In this mode, when the waypoint table becomes full, the travel guide device automatically adjusts the collection rate by selecting a slightly longer collection interval, optionally adjusting other waypoint collection parameters, and compressing the stored waypoints. This procedure is repeated each time the waypoint table is filled, until collection of waypoints is stopped. Thus, resolution of waypoint collection is automatically scaled with the length of a trip documented by the collected waypoints.

Figure 3H:
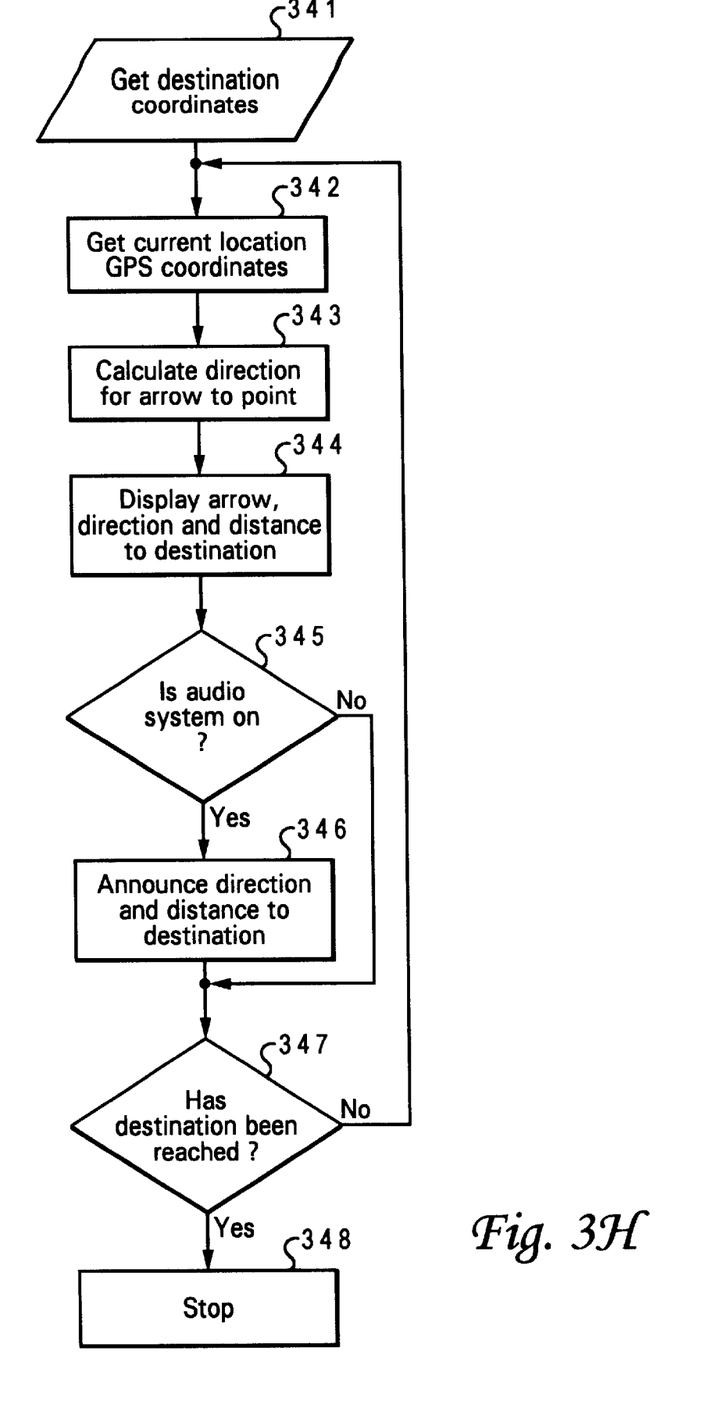

FIG. 3H depicts a process for destination direction navigation within the travel guide device of the present invention. This process may be initiated by the user selecting the general directions navigation option (see step 327 in FIG. 3E). The process begins at step 341, which depicts retrieval of the GPS coordinates for a desired destination. The destination coordinates may be manually entered or ascertained from data within the travel guide device, such as a digitally encoded map indexed by GPS coordinates. The process then passes to step 342, which illustrates retrieving the GPS coordinates for the current location. The process passes next to step 343, which depicts calculating the direction for the arrow to point on a display (which may involve simply computing the azimuth to the desired destination), and then to step 344, which illustrates displaying the arrow on a display device, optionally with text indicating the direction and distance to the desired destination.

The process then proceeds to optional step 345, which depicts a determination of whether the audio system is on. If so, the process proceeds to step 346, which depicts announcing the direction and distance to the destination, and then to step 347. Otherwise, the process proceeds directly to step 347, which illustrates a determination of whether the destination has been reached. If the destination has not yet been reached, the process returns to step 342 to update the direction and distance information. If the destination has been reached, the process proceeds instead to step 348, which illustrates the process becoming idle until again initiated to navigate to a desired destination.

The arrow displayed to indicate the direction of a desired location may be superimposed on a digitally encoded map within the display. However, the travel guide device may also direct a user to a desired destination without any map of the area being navigated. The travel guide device simple computes a general direction of travel from the current location to the destination and provides the user with a pointing arrow, together with optional general directions in text or audio form. The destination GPS coordinates may be looked up from a directory, or retrieved from a World Wide Web site maintained by the destination enterprise and including the GPS coordinate information in a recognizable format. Thus, the user may enter destination coordinates directly from a Web site. An arrow on the display points in the general direction of the destination, and text on the display and/or sound from the audio system indicates:

"The destination is about two miles ahead and to the left of your current location".

The process is repeated as progress is made toward the destination, guiding the user incrementally closer to the destination.

The general directions navigation option may be employed to retrace a route previously taken and documented by automatic waypoint collection as previously described. The destination arrow and directions are simply computed for each waypoint, with the next waypoint being selected as a new destination when a current waypoint is reached.

FIG. 3I depicts a directory function within the travel guide device of the present invention. The travel guide device database may include a directory of locations (including GPS coordinates) for a number of places such as: hotels and other places of lodging; restaurants and other places to eat; points of interest; medical facilities, pharmacies, and the like; and other subscribing locations. The directory entry may include enterprise names, addresses and telephone numbers, World Wide Web and/or e-mail addresses, GPS coordinates, and brief descriptions. The directory may be maintained manually and/or updated automatically over the communications facilities of the travel guide device. For example, cellular communications service providers within a given area may automatically establish a communications link to the travel guide device as it enters a defined service area and transmit a local directory to the travel guide device.

The process begins at step 349, which illustrates determination of a "range" (radial distance) of locations surrounding a current position to be displayed. The range may be user selected or automatically adjusted based on the number of directory entries retrieved for a specific range value. The process then passes to step 351, which depicts displaying all directory locations within the specified range. The display may be ordered by proximity, by category (restaurants, filling stations, etc.), or according to a user selected preference.

The process then passes to step 351, which illustrates a determination of whether the user has selected a location. If not, the process passes to step 352, which depicts a determination of whether the user has changed the range value. If the range value has not been changed, the process returns to step 351; if the range value has changed, the process returns instead to step 349. This step may optionally also include a determination of whether the GPS coordinates of the travel guide device's location have changed, either by a predefined amount or by an amount sufficient to bring new directory listings within the range.

If the user has selected a location, the process proceeds to step 353, which depicts a determination of whether the user has selected a navigation option or a communications option with respect to the selected location. If a navigation option was selected, the process proceeds to step 354, which illustrates starting the navigation program of the travel guide device. If a communications option was selected, the process proceeds instead to step 355, which depicts starting the communications program of the travel guide device. From either of step 354 or 355, the process passes to step 356, which illustrates the process becoming idle until the directory function is again invoked by the user.

The directory function of the travel guide device allows a user to view a list of directory entries for locations within a defined range of the user's current position. The user may select a directory entry as a destination for the travel guide device's navigation facilities, or connect to another communications device using information obtained from the selected directory entry.

Figure 3J:
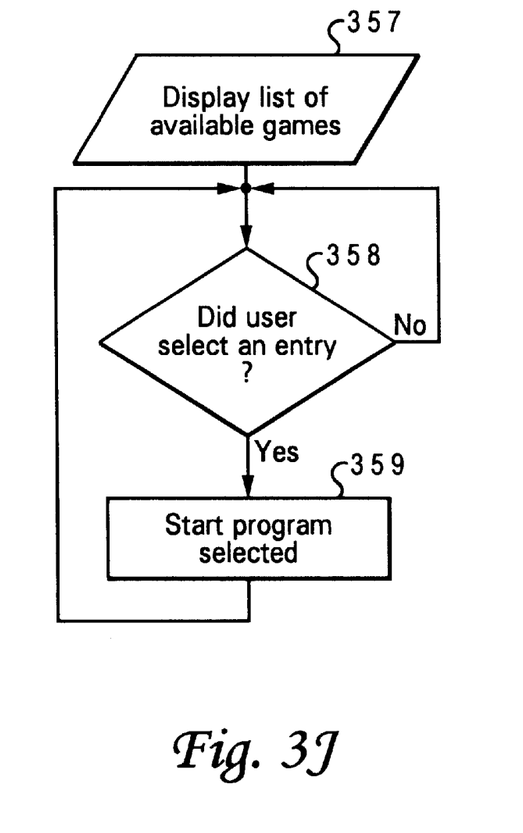

FIG. 3J depicts a process for user selection of games within the travel guide device of the present invention. The travel guide device may provide games for education and/or entertainment, such as games relating to point-of-interest or general area narrations. Where multiple displays and input devices are supported by the travel guide device, interactive, competitive games may be provided. The process begins at step 357, which depicts displaying the list of available games, and passes to step 358, which illustrates a determination of whether the user has selected an entry. If so, the process proceeds to step 359, which depicts starting the selected program. If not, however, the process simply returns to step 358 to await user selection.

Figure 3K:
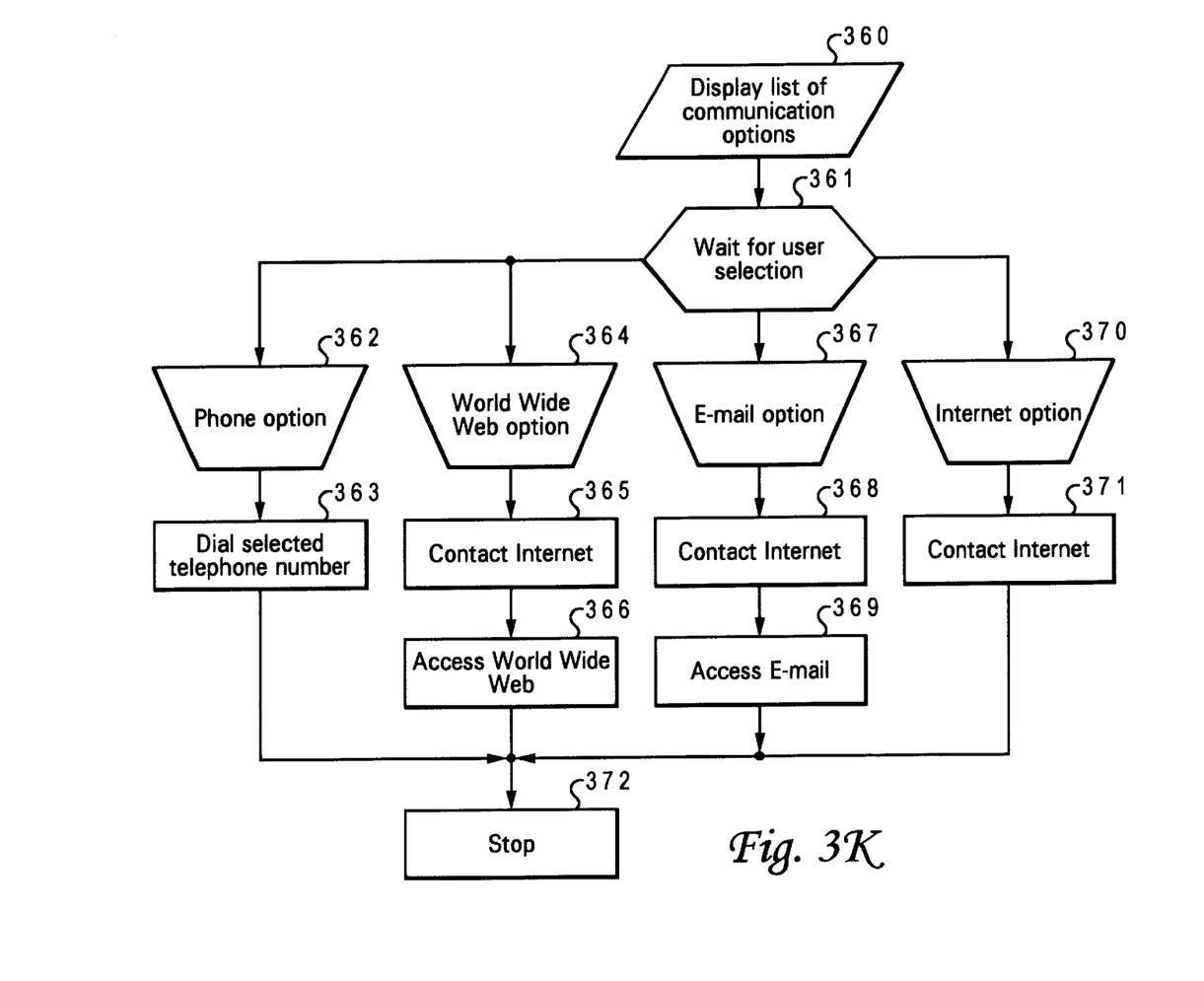

FIG. 3K depicts a process for utilizing the communications function of the travel guide device of the present invention. The travel guide device includes an interface to a cellular phone or other mobile communications device, or a cellular modem. Communications systems outside the vehicle in which the travel guide device is being utilized may thus be contacted to download directories, access World Wide Web sites, etc.

The process begins at step 360, which depicts displaying the list of communications options. The process then passes to step 361, which illustrates awaiting user selection of a communication option. The process may then pass to steps 362 and 363, which depict providing access to phone services and dialing a selected number. The process may alternatively pass to steps 364–366, which illustrate providing access to the World Wide Web, to steps 367–369, which depict providing access to Internet E-mail facilities, or to steps 370 and 371 which illustrate providing access to the Internet for other functional purposes. From any of steps 363, 366, 369, or 371, the process passes to step 372, which illustrates stopping the communications function.

It is important to note that while the present invention has been described in the context of a fully functional data processing system and/or device network, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of automatically collecting waypoints, comprising:

retrieving GPS coordinates for a current location;

comparing the retrieved GPS coordinates to previously collected GPS coordinates;

determining whether the retrieved GPS coordinates are within a defined distance from the previously collected GPS coordinates;

responsive to determining that the retrieved GPS coordinates are not within the defined distance from the previously collected GPS coordinates, storing the retrieved GPS coordinates as a waypoint;

determining whether a space allocated for a waypoint table is full; and responsive to determining that the allocated space is full, increasing the defined time period for retrieval of GPS coordinates and compressing waypoints within the waypoint table to conform to waypoints collected utilizing the increased defined time period.

2. The method of claim 1, wherein the step of retrieving GPS coordinates for a current location further comprises:

determining whether a defined time period has elapsed since a previous retrieval of GPS coordinates.

3. A method of automatically collecting waypoints, comprising:

retrieving GPS coordinates for a current location upon elapse of a collection interval;

comparing the retrieved GPS coordinates to previously collected GPS coordinates;

determining whether the retrieved GPS coordinates are within a defined distance from the previously collected GPS coordinates;

responsive to determining that the retrieved GPS coordinates are not within the defined distance from the previously collected GPS coordinates, storing the retrieved GPS coordinates as a waypoint;

determining whether the retrieved GPS coordinates and the previously collected GPS coordinates indicate a stop in motion by determining whether the retrieved GPS coordinates match the previously collected GPS coordinates; and responsive to determining that the retrieved GPS coordinates match the previously collected GPS coordinates:

creating a time period entry for a waypoint within a waypoint table for the retrieved GPS coordinates if none exists; and incrementing the time period entry for the waypoint if one exists.

4. A method of automatically collecting waypoints, comprising:

retrieving GPS coordinates for a current location;

comparing the retrieved GPS coordinates to a straight line intersecting first and second previously collected GPS coordinates;

determining whether the retrieved GPS coordinates are within a defined tolerance from the straight line; and responsive to, determining that the retrieved GPS coordinates are not within the defined tolerance from the straight line, storing the retrieved GPS coordinates as a waypoint.

5. The method of claim 4, further comprising:

responsive to determining that the retrieved GPS coordinates are within the defined tolerance from the straight line, replacing an endpoint for a straight line entry including the first and second previously collected GPS coordinates within a waypoint table with the retrieved GPS coordinates.

6. The method of claim 5, further comprising:

determining whether a space allocated for the waypoint table is full; and responsive to determining that the allocated space is full, increasing the defined tolerance for a straight line entry within the waypoint table and compressing waypoints within the waypoint table to conform to waypoints collected utilizing the increased defined tolerance for a straight line entry.

7. A method of automatically collecting waypoints, comprising:

retrieving GPS coordinates for a current location upon elapse of a collection interval;

comparing the retrieved GPS coordinates to first and second previously collected GPS coordinates;

determining whether the retrieved GPS coordinates reflect a loss of signal;

responsive to determining that the retrieved GPS coordinates reflect a loss of signal:

creating a loss of signal entry, if none exists, within a waypoint table, wherein the loss of signal entry includes a time period since a previous retrieval of GPS coordinates; and updating the loss of signal entry, if one exists, with the time period since the previous retrieval of GPS coordinates;

determining whether the retrieved GPS coordinates reflect a stop in motion;

responsive to determining that the retrieved GPS coordinates reflect a stop in motion:

creating a stop in motion entry, if none exists, within the waypoint table, wherein the stop in motion entry includes a time period elapsed during the stop in motion; and updating the stop in motion entry, if one exists, with the time period elapsed during the stop in motion;

determining whether the retrieved GPS coordinates reflect a minimum distance travelled from the first previously retrieved GPS coordinates; and responsive to determining that the retrieved GPS coordinates reflect the minimum distance travelled from the first previously retrieved GPS coordinates:

determining whether the retrieved GPS coordinates are within a minimum tolerance from a straight line intersecting the first and second previously retrieved GPS coordinates;

responsive to determining that the retrieved GPS coordinates are within the minimum tolerance from the straight line, replacing the first previously retrieved GPS coordinates with the retrieved GPS coordinates; and responsive to determining that the retrieved GPS coordinates are not within the minimum tolerance from the straight line, storing the retrieved GPS coordinates within the waypoint table as a waypoint.

8. The method of claim 7, further comprising:

determining whether a space allocated for the waypoint table is full;

responsive to determining that the allocated space is full, increasing the collection interval, the minimum distance, and the straight line tolerance; and compressing waypoints within the waypoint table utilizing the increased collection interval, minimum distance, and straight line tolerance.

9. The method of claim 7, further comprising:

receiving destination coordinates;

comparing destination coordinates to previously collected GPS coordinates;

determining a direction and distance from last collected GPS coordinates to the destination coordinates; and communicating the direction and distance from the last collected GPS coordinates to the destination coordinates to a user.

10. The method of claim 9, further comprising:

illustrating the direction and distance from the last collected GPS coordinates to the destination coordinates on a display.

11. The method of claim 10, further comprising:

illustrating the destination coordinates, the last collected GPS coordinates, and the direction and distance from the last collected GPS coordinates to the destination coordinates on a digitally encoded map within the display.

12. The method of claim 9, further comprising:

determining whether an audio system is on; and responsive to determining that the audio system is on, announcing the direction and distance from the last collected GPS coordinates to the destination coordinates on the audio system.

13. The method of claim 7, further comprising:

determining a range of directory locations surrounding a current position;

displaying all directory locations within the range on a display.

14. The method of claim 13, further comprising:

responsive to determining that the user has selected a location, displaying the selected location on the display;

responsive to determining that the user has selected a navigation option, starting a navigation program.

15. A method of automatically collecting waypoints, comprising:

retrieving GPS coordinates for a current location;

comparing the retrieved GPS coordinates to previously collected GPS coordinates;

determining whether the retrieved GPS coordinates are within both a defined distance and a defined altitude from the previously collected GPS coordinates; and responsive to determining that the retrieved GPS coordinates are not within either the defined distance or the defined altitude from the previously collected GPS coordinates, storing the retrieved GPS coordinates as a waypoint.

16. A method of automatically collecting waypoints, comprising:

retrieving GPS coordinates for a current location upon elapse of a collection interval;

determining whether the retrieved GPS coordinates reflect a loss of signal;

responsive to determining that the retrieved GPS coordinates reflect a loss of signal:

creating a loss of signal entry, if none exists, within a waypoint table, wherein the loss of signal entry includes a time period since a previous retrieval of GPS coordinates; and updating the loss of signal entry, if one exists, with the time period since the previous retrieval of GPS coordinates.

* * * * *